United States Patent [19]

Clostermeyer

[11] Patent Number: 4,604,848
[45] Date of Patent: Aug. 12, 1986

[54] LARGE BALING PRESS

[75] Inventor: Gerhard Clostermeyer, Gutersloh, Fed. Rep. of Germany

[73] Assignee: Claas Ohg, Harsewinkel, Fed. Rep. of Germany

[21] Appl. No.: 750,752

[22] Filed: Jun. 28, 1985

[30] Foreign Application Priority Data

Jul. 4, 1984 [DE] Fed. Rep. of Germany ....... 3424567

[51] Int. Cl.$^4$ .......................................... B65B 11/04
[52] U.S. Cl. ..................................... 53/118; 53/587; 53/389; 242/75.2
[58] Field of Search ...................... 53/118, 587, 389; 56/341; 242/75.2

[56] References Cited

U.S. PATENT DOCUMENTS

| | | | |
|---|---|---|---|
| 2,678,551 | 5/1954 | Lambach | 242/75.2 |
| 3,364,293 | 1/1968 | Culpin | 53/389 X |
| 4,407,113 | 10/1983 | Core | 53/587 |
| 4,409,784 | 10/1983 | Van Ginhoven | 53/587 |
| 4,458,467 | 7/1984 | Situlman | 53/587 |
| 4,514,969 | 5/1985 | Moosbrucker | 53/118 |

Primary Examiner—John Sipos
Attorney, Agent, or Firm—Michael J. Striker

[57] ABSTRACT

A large baling press has a pressing chamber for forming bales, a device for supplying a web material for wrapping the bales, and a brake which acts on the wrapping material supply device so that in the beginning of wrapping the braking force is smaller than during the subsequent complete wrapping.

9 Claims, 3 Drawing Figures

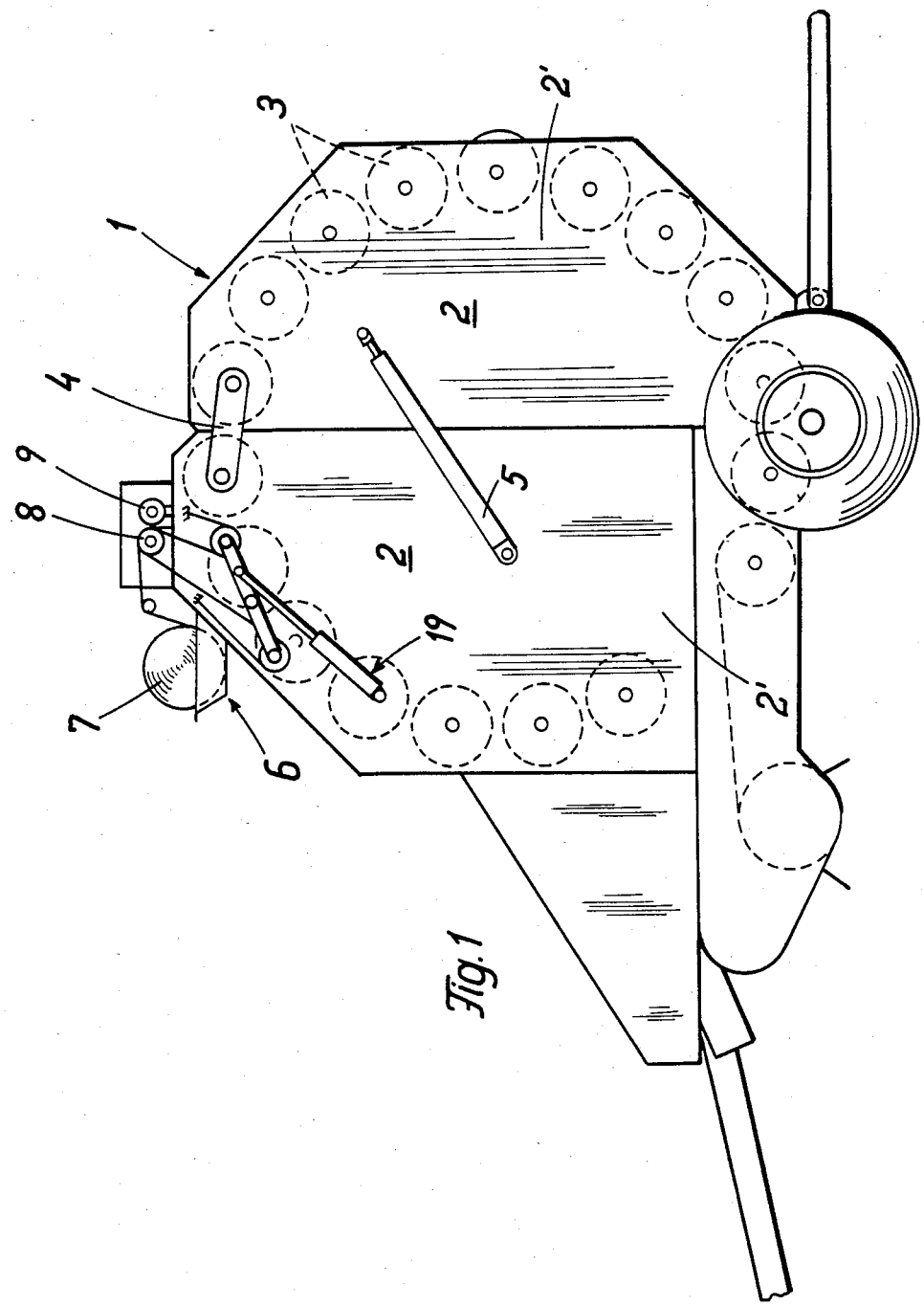

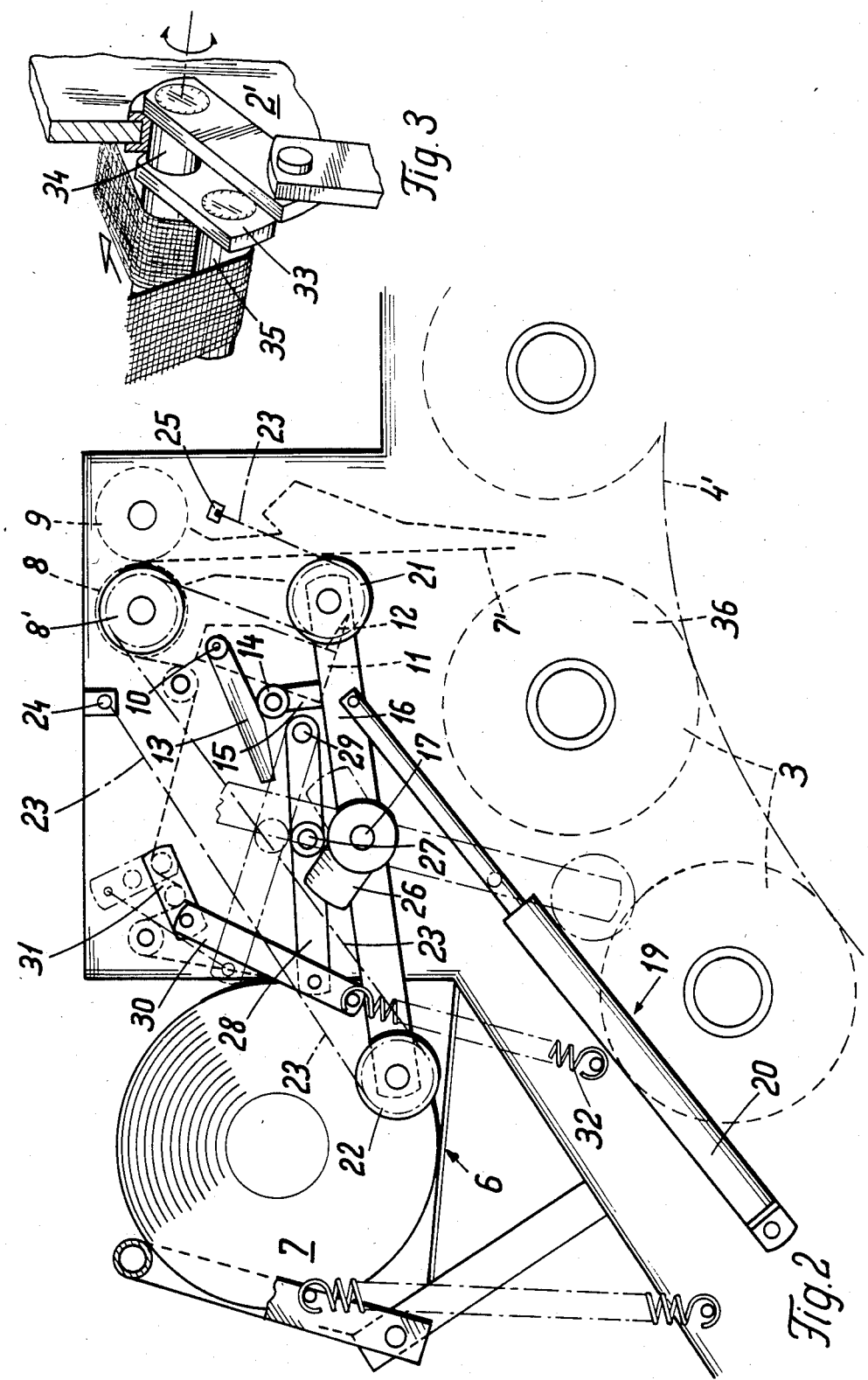

LARGE BALING PRESS

BACKGROUND OF THE INVENTION

The present invention relates to a large baling press for forming bales of agricultural products. More particularly it relates to a large baling press which has a pressing chamber formed by lateral walls and peripheral driven winding elements, a holding device for receiving a web roll which supplies a web material to wrap the bales, and a cutter which cuts a certain length of the web after wrapping around a finished bale.

Large baling presses of the abovementioned type are known in the art. One of such large baling presses is disclosed, for example in the U.S. Pat. No. 4,366,665. In this press the web roller is held with its rotary axle by cones which are supported on levers, and one cone is connected with its holder via a braking device. The force of the brake is adjustable so as to maintain a certain tension of the web during its pulling. The disadvantage of such an arrangement is that once the braking force has been adjusted it is always maintained at the same level, while the force which is used for pulling a web becomes greater because of a continuously reducing web roller diameter and thereby the active lever arm. Therefore, a uniform web tension cannot be achieved, unless the force of the brake is always subsequently controlled, which because of the involved expenses cannot be obtained within reasonable limits.

For avoiding this disadvantage, it was proposed by the applicant in his U.S. patent application No. 634,616 filed 7/26/84 to arrange on the web roller a braking rod supported on the turning lever, so that increasing pressure acts on the roller with the reducing roller diameter. Such an arrangement operates in a satisfactory manner, or in other words, the web tension is maintained always the same regardless of the diameter of the web roller. The disadvantage of this arrangement is that the braking force can generally be adjusted only so high that in the beginning of a winding process the initial portion of the web can be pulled by the finished bale and a winding roller of the pressing chamber. As a result of this, the bales can be wrapped not sufficiently tight on the one hand, and very low web tension can lead to difficulties during cutting of the web by a cutter on the other hand.

SUMMARY OF THE INVENTION

Accordingly, it is an object of the present invention to provide a large baling press which avoids the disadvantages of the prior art.

More particularly it is an object of the present invention to provide a large baling press in which, on the one hand, the initial portion of the web can be pulled by the bale and a winding element, and on the other hand, the bale is tightly wrapped and a sufficiently high web tension takes place during the cutting process.

In keeping with these objects and with others which will become apparent hereinafter, one feature of the present invention resides, briefly stated, in a large baling press in which a braking force applied to a web supplying means is lower in the beginning of the wrapping of a finished press, than during the subsequent complete wrapping.

When the press is designed in accordance with the applicant's invention, an unobjectionable pulling of the initial portion of the web into the pressing chamber is guaranteed on the one hand and a sufficiently high web tension during the wrapping and subsequent cutting is provided on the other hand.

In accordance with another advantageous feature of the present invention the brake is composed of a plurality of rods so that the web is wrapped around the rods, wherein the wrapping degree of the rods are changeable.

Still another feature of the present invention is that the rods can include two shafts, wherein one shaft is supported rotatably, and the other shaft is mounted rotatably parallel to the one shaft by means of a lever.

In accordance with a further feature of the present invention, a turnable arm is provided with one end fixedly connected with the rotatable shaft and the other end pivotably connected with a spring-held shackle, wherein a lifting arm engages the shackle and is liftable and lowerable by a cam.

In a simple manner, the cam be connected with a turning lever which is turnable by means of cylinder-piston units.

Still a further feature of the present invention which provides for a simple construction is that the turning lever has at its both ends a deviating roller for a roller chain, and the roller chain drives cyclically a pulling roller which is provided for pulling the wrapping web and has a free running.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side view of a large baling press in accordance with the present invention;

FIG. 2 is a view showing an upper part of the large baling press of FIG. 1 on an enlarged scale; and FIG. 3 is a perspective view of a fragment of FIG. 2.

DESCRIPTION OF A PREFERRED EMBODIMENT

A large baling press of a known construction is identified with reference numeral 1 as a whole. The press has a housing which includes two housing halves 2. Driven winding rollers 3 are supported in the housing halves 2. Side walls 2' of the housing halves and the winding rollers 3 form a pressing chamber of the press. The side walls of the rear housing half are connected with the side walls of the front housing half by shackles 4. For discharging a finished large bale, the rear housing half is turnable together with the associated winding rollers by means of two laterally arranged cylinder-piston units 5, only one of which is shown in the drawing.

A box 6 is arranged in the upper region of the press. It is supported by wall portions which are fixedly connected with the machine. A web roller 7 is accommodated in the box 6 and has a width substantially corresponding to the width of the finished bales. An initial portion 7' of the web is held by a pulling roller 8 and a pressing roller 9 cooperating with the pulling roller. A supporting shaft 10 is rotatably supported between both side walls 2 and is located under the pulling roller 8. The supporting shaft 10 carries a cutter holder 11. A cutter 12 is connected with the cutter holder 11 and has a cutting edge which is longer than the width of the web roller 7.

A lever 13 is welded with one end of the supporting roller 10. The lever 13 is supported on a roller 14 of a projection 15 which is a part of a turning lever 16. The turning lever 16 is turnably supported substantially centrally on a pin 17 which is connected with one side wall 2. For this purpose a piston rod 18 of a cylinder-piston unit 19 engages the lever 16, while a cylinder 20 of the cylinder-piston unit 19 is fixedly connected with one side wall 2. The turning lever 16 carries at its ends deviating rollers 21 and 22. A roller chain 23 is arranged on the rollers 21 and 22. One end of the roller chain 23 is fixed to a console 24 connected with one side wall 2 whereas the other end of the roller chain is fixed on a console 25 which is also connected with the side wall. Starting from the console 24 the roller chain 23 goes around the deviating roller 22, then a chain sprocket 8′ arranged on the drawing roller 8, then over the deviating roller 21 and to the console 25.

For rotating the pin 17, a cam 26 is fixedly connected with the turning lever 16. A roller 27 abuts against the cam 26 and is rotatably connected with a lever arm 28. One end of the lever arm 28 is supported on a pin 29. A shackle 30 is pivotably connected with the lever arm 28 and more particularly with its end which lies opposite to the pin 29. The shackle 30 engages with its one end a turning arm 31 and is held with its other end by a pulling spring 32. The turning arm 31 is fixedly connected with one end of a shaft 34 supported in the side walls 2. Two levers 33 are fixedly welded with the shaft 34 and carry a rod 35 at their ends facing away of the shaft 34.

The web which is rolled from the web roller 7 surrounds, in the position shown in FIG. 3, the rod 35 and the shaft 34 in substantially S-shaped manner, whereby the through-running web is braked. This is needed to guarantee a firm wrapping of the bales with the web, for example a net web. During the pulling-in phase of the initial portion 7′ of the web between a bale and a winding roller identified with reference numeral 36, this braking action must be lifted, because otherwise the web cannot be pulled-in by the finished bale and the winding roller 36.

The operation of the large baling press in accordance with the present invention is as follows:

As long as a finished bale is formed in the pressing chamber, the lever 16 is turned from the position shown in FIG. 2 in solid lines to the position shown in broken lines by displacing the piston rod 18. As a result of this turning movement, the deviating rollers 21 and 22 are positioned so that the pulling roller 8 driven through the roller chain 23 in clockwise direction makes a predetermined number of revolutions and thereby the initial portion 7′ of the web is guided between the bale 4′ and the winding roller 36. The pulling roller 8 is designed with a free running which allows a rotary movement of the roller 8 only in clockwise direction. During this movement phase the cam 26 is turned in clockwise direction and therefore lifts first the roller 27. By means of the roller 27, the lifting arm 28 is turned in clockwise direction, whereby through the shackle 30 the turning arm 31 is turned from its position shown in FIGS. 2 and 3 in solid lines, to the position shown in FIG. 2 in broken lines. The rod 35 is thereby turned away from the web, so that the web runs over the shaft 35 without rocking the latter. The braking action obtained by the position of the rod 35 to the shaft 34 is lifted, so that the initial portion 7′ of the web can be unobjectionably pulled by the winding roller 36 and the finished bale. The cams 26 are located at this time substantially vertically.

During further turning of the lever 16 to the position shown in broken lines, the cam 26 moves also to the position shown in broken lines so that the roller 27 assumes again its basic position. Thereby the rod 35 is pulled into the web pulled from the web roller, so that the web wraps around both the rod 35 and the shaft 34 in a S-shaped manner and is thereby braked. This braking serves for respectively high web tensioning which on one hand acts for tight wrapping of the bale and on the other hand tightly holds the web during the cutting process. After severing of the web by the cutter 11, the cylinder-piston unit is extended and the inventive arrangement again assumes its initial position.

As can be seen from FIG. 2, additionally to the cyclically operating brake which is formed by the shaft 34 and the rod 35, a further brake is provided. It includes a braking rod which rests on the rollers 7, so that also during the beginning of the wrapping process, a certain base web tensioning is guaranteed. This braking action is not described herein in detail, since it is disclosed in the applicant's U.S. patent application 634,616 incorporated here by reference.

It will be understood that each of the elements described above, or two or more together, may also find a useful application in other types of constructions differing from the types described above.

While the invention has been illustrated and described as embodied in a large baling press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A large baling press for forming bales of agricultural products, comprising means forming a pressing chamber for pressing a bale and including side walls which limit said pressing chamber laterally and a plurality of driven winding elements which limit said pressing chamber peripherally; means for supplying a web material to wrap a finished bale so that a portion of the web material with a predetermined length is pulled from said supplying means by the bale and said winding elements; means for cutting the pulled portion of the web material and including a cutter; and braking means acting upon the pulled portion of the web material and including two rods which are wrapped around by the web material and provided with means for rotatably mounting one of said rods around its own axis and means for turning the other of said rods around and parallel to said one rod wherein said means for turning said other rod includes a turning arm having two ends of which one end is fixedly connected with said one rotatable rod to rotate said arm, a shackle articulately connected with the other end of said turning arm, spring means connected to said shackle for biasing said other rod into the path of the web material for braking the web, and a lifting arm engaging said shackle against said spring means for moving said other rod out of the path of the web material.

2. A large baling press as defined in claim 1, wherein said web material supplying means includes a web roller and a holding device which holds said web roller.

3. A large baling press as defined in claim 1, wherein said rods include two shafts so that one of said shafts forms said one rod, whereas the other of said shafts forms said other rod.

4. A large baling press as defined in claim 1, wherein said means for turning said other rod also includes a lever cooperating with said rods so that said other rod is turnable parallel to said one rod by means of said lever.

5. A large baling press as defined in claim 1; and further comprising means for lifting and lowering said lifting arm and including a cam.

6. A large baling press as defined in claim 5; and further comprising a turning lever fixedly connected with said cam and arranged turnably.

7. A large baling press as defined in claim 6; and further comprising means for turning said turning lever an including at least one cylinder-piston unit.

8. A large baling press as defined in claim 6, wherein said turning lever has two ends and is provided at each of its ends with a deviating roller; and further comprising a roller chain carried by said deviating rollers of said turning lever.

9. A large baling press as defined in claim 8; and further comprising a pulling roller for pulling the web material and provided with a free running, said roller chain being arranged to cyclically drive said pulling roller.

* * * * *